(12) United States Patent
Ocenasek et al.

(10) Patent No.: US 7,321,635 B2
(45) Date of Patent: Jan. 22, 2008

(54) LINEARIZATION OF AMPLIFIERS USING BASEBAND DETECTION AND NON-BASEBAND PRE-DISTORTION

(75) Inventors: Josef Ocenasek, Whippany, NJ (US); John S. Rucki, New Providence, NJ (US)

(73) Assignee: Andrew Corporation, Westchester, IL (US)

( * ) Notice: Subject to any disclaimer, the term of this patent is extended or adjusted under 35 U.S.C. 154(b) by 696 days.

(21) Appl. No.: 10/637,777

(22) Filed: Aug. 8, 2003

(65) Prior Publication Data

US 2004/0032912 A1    Feb. 19, 2004

Related U.S. Application Data

(60) Provisional application No. 60/403,970, filed on Aug. 16, 2002.

(51) Int. Cl.
H04K 1/02    (2006.01)
(52) U.S. Cl. .................. 375/297; 375/296; 375/141; 375/130; 330/149; 330/151; 330/136; 455/114.3; 455/63.1; 455/126
(58) Field of Classification Search .............. 375/297, 375/296, 141, 130; 455/114.3, 126, 63.1; 330/136, 149, 151
See application file for complete search history.

(56) References Cited

U.S. PATENT DOCUMENTS

| 5,760,646 | A | * | 6/1998 | Belcher et al. ............. 330/149 |
|---|---|---|---|---|
| 6,304,140 | B1 | | 10/2001 | Thron et al. ................ 330/149 |
| 6,496,062 | B1 | | 12/2002 | Nitz et al. ..................... 330/52 |
| 2002/0034260 | A1 | | 3/2002 | Kim .......................... 375/296 |
| 2002/0047746 | A1 | | 4/2002 | Dartois ....................... 330/151 |
| 2002/0171485 | A1 | * | 11/2002 | Cova ......................... 330/149 |
| 2002/0186783 | A1 | | 12/2002 | Opas et al. ................. 375/297 |
| 2002/0187761 | A1 | | 12/2002 | Im et al. ..................... 455/126 |
| 2003/0020538 | A1 | | 1/2003 | Kim ............................. 330/2 |
| 2003/0045253 | A1 | | 3/2003 | Hongo et al. .............. 455/127 |
| 2003/0063686 | A1 | | 4/2003 | Giardina et al. ........... 375/296 |
| 2003/0117215 | A1 | * | 6/2003 | O'Flaherty et al. ........ 330/149 |
| 2004/0021517 | A1 | * | 2/2004 | Irvine et al. ............... 330/151 |

* cited by examiner

Primary Examiner—Chieh M. Fan
Assistant Examiner—Eva Zheng
(74) Attorney, Agent, or Firm—Steve Mendelsohn

(57) ABSTRACT

In an amplifier system that linearizes an amplifier by pre-distorting the input signal prior to amplification, a baseband pre-distortion processor processes the input signal in a digital baseband domain to generate one or more pre-distortion parameters based on the power of the digital baseband input signal. The digital baseband signal is up-converted and D/A-converted into a non-baseband (e.g., IF or RF) signal which is then pre-distorted, e.g., using a phase/gain adjuster or a vector modulator. By generating the pre-distortion parameters at baseband, while pre-distorting the input signal at non-baseband, the amplifier system avoids the cost and inaccuracies associated with analog signal delay and RF power detection of prior-art "all-RF" pre-distortion implementations, while avoiding the wider-bandwidth filtering of prior-art "all-baseband" pre-distortion implementations.

20 Claims, 4 Drawing Sheets

LINEARIZATION OF AMPLIFIERS USING BASEBAND DETECTION AND NON-BASEBAND PRE-DISTORTION

CROSS-REFERENCE TO RELATED APPLICATIONS

This application claims the benefit of the filing date of U.S. provisional application No. 60/403,970, filed on Aug. 16, 2000.

FIELD OF THE INVENTION

The present invention relates to signal processing, and, in particular, to techniques for linearizing amplifiers based on pre-compensation.

BACKGROUND OF THE INVENTION

Amplifiers, such as high-power amplifiers used in the base stations of wireless communication systems, typically exhibit non-linearity over their operating ranges. This non-linearity can result in noise that can corrupt or otherwise interfere with the communications. To address this problem, additional circuitry may be added to an amplifier in an attempt to linearize the effective amplifier response. Conventional techniques for linearizing amplifiers typically involve feed-forward compensation and/or pre-compensation.

In feed-forward compensation, an auxiliary signal is fed forward and combined with the output of the amplifier to adjust the output signal for non-linearities in the amplifier transfer function. In amplifier linearization based on pre-compensation, the input signal that is to be amplified is pre-distorted prior to being applied to the amplifier in order to adjust the input signal based on known non-linearities in the amplifier transfer function. The pre-distortion module is typically controlled using a feed-back signal based on the output signal generated by the amplifier.

FIG. 1 shows a block diagram of a linearized amplifier system 100 according to the prior art. Amplifier system 100 utilizes pre-compensation to linearize the response of a high-power amplifier (HPA) 118, where the pre-distortion is implemented at baseband in the digital domain.

In particular, digital baseband processor 102 converts digital in-phase and quadrature input signals $I_{in}$ and $Q_{in}$ into a pre-distorted digital intermediate frequency (IF) signal. More particularly, the digital input signals $I_{in}$ and $Q_{in}$ are clipped and filtered (124) to generate clipped signals $I_{clip}$ and $Q_{clip}$, which are then upsampled (126) to form the baseband signals I and Q input to baseband pre-distorter 128, which generates baseband pre-distorted signals I' and Q'. High-speed digital I/Q modulator 138 converts the baseband pre-distorted signals I' and Q' to the digital IF domain.

Within baseband pre-distorter 128, peak detector 132 computes the instantaneous digital power ($I^2+Q^2$) of the baseband signals I and Q, which computed power is used as an index into look-up table (LUT) 134, which stores pre-distortion parameters A and B. Digital I/Q pre-distorter 136 applies the pre-distortion parameters A and B to the delayed baseband signals I and Q from delay 130 to generate the baseband pre-distorted signals I' and Q' according to Equations (1)-(3) as follows:

$$I'+jQ'=(I+jQ)(A+jB) \quad (1)$$

where $$I'=IA-QB \quad (2)$$

$$Q'=QA+IB \quad (3)$$

Digital delay 130 delays the baseband signals I and Q to compensate for the processing times of blocks 132 and 134, so that I/Q pre-distorter 136 pre-distorts the signals I and Q with the appropriate corresponding parameters A and B.

Digital-to-analog converter (DAC) 104 converts the digital IF signal from processor 102 to the analog domain based on a clock signal from oscillator 106. The resulting pre-distorted analog signal is then low-pass filtered at extra-wide LPF 108, up-converted to radio frequency (RF) at multiplier 110 based on a mixing signal from local oscillator 112, band-pass filtered at extra-wide BPF 114, and amplified by low-power amplifier 116. The resulting analog pre-distorted signal is applied to high-power amplifier 118 to generate the amplified output signal from linearized amplifier system 100.

A portion of the amplified output signal can (optionally) be tapped by tap 120 and fed back to receiver 122, which monitors the amplified output signals for regrowth levels in order to dynamically update the values stored in LUT 134 for parameters A and B.

As described above, in linearized amplifier system 100 of FIG. 1, the pre-distortion processing functions of detection of signal power, retrieval of pre-distortion parameters A and B, and actual pre-distortion of the input signal are all implemented in the digital domain at baseband. In addition, the delay of the input signal for signal synchronization is also implemented in the digital domain at baseband. Meanwhile, the filtering of the analog pre-distorted signal is performed using extra-wide filters 108 and 114.

FIG. 2 shows a block diagram of another linearized amplifier system 200 according to the prior art. Like amplifier system 100 of FIG. 1, amplifier system 200 utilizes pre-compensation to linearize the response of a high-power amplifier 218; however, in amplifier system 200, the pre-distortion is implemented at RF in the analog domain.

In particular, digital baseband processor 202 comprises clip & filter block 224, upsampler 226, and high-speed digital I/Q modulator 238, which are analogous to corresponding blocks 124, 126, and 138 of FIG. 1, to convert the baseband digital in-phase and quadrature input signals $I_{in}$ and $Q_{in}$ into an (undistorted) digital IF signal. DAC 204 converts the digital IF signal into an analog IF signal, which is then low-pass filtered at LPF 208, up-converted to RF at multiplier 210, band-pass filtered at narrow BPF 214, and amplified by low-power amplifier 216.

Part of the RF signal from amplifier 216 is tapped at tap 231 and forwarded to diode 232, which functions as an envelope detector to detect the instantaneous analog power of the RF signal. The analog power is digitized at analog-to-digital converter (ADC) 233, with the resulting digital power value being used an index into LUT 234, which stores pre-distortion parameters A and B. These pre-distortion parameters are converted to the analog domain by DACs 235a-b and then applied to analog pre-distorter 236 (e.g., a phase/gain adjuster or a vector modulator), which accordingly pre-distorts the delayed RF signal from delay 230 to generate the pre-distorted RF signal that is then applied to high-power amplifier 218 to generate the amplified output signal from linearized amplifier system 200.

As in amplifier system 100, a portion of the amplified output signal can (optionally) be tapped by tap 220 and fed back to receiver 222, which monitors the amplified output signals for regrowth levels in order to dynamically update the values stored in LUT 234 for parameters A and B.

As described above, in linearized amplifier system 200 of FIG. 2, the pre-distortion processing functions of detection of signal power and the actual pre-distortion of the signal are implemented at RF, while the retrieval of pre-distortion parameters A and B from the LUT is performed digitally. In addition, the delay of the input signal for signal synchronization is also at RF and in the analog domain. Meanwhile, the filtering of the (undistorted) analog signal can be performed using relatively narrow-band filters 208 and 214.

Comparing amplifier systems 100 of FIG. 1 and 200 of FIG. 2, both can compensate not only for non-linearities in the high-power amplifier, but also for any distortion along the entire transmit path. In the baseband pre-distortion implementation of FIG. 1, however, the bandwidth of the entire transmit path has to be several times larger than the signal bandwidth, since the pre-distortion energy falls outside the original signal bandwidth. On the other hand, in the RF pre-distortion implementation of FIG. 2, wide bandwidth is not required throughout the entire path. Nevertheless, the RF pre-distortion implementation does involve more analog circuitry (in particular, delay 230 and ADC 233), which can increase the cost. Moreover, performing envelope detection in the analog RF domain (using diode 232) can lead to accuracy problems relative to the detection in the digital baseband domain of the baseband pre-distortion implementation of FIG. 1.

BRIEF DESCRIPTION OF THE DRAWINGS

Aspects, features, and advantages of the present invention will become more fully apparent from the following detailed description, the appended claims, and the accompanying drawings in which like reference numerals identify similar or identical elements.

DETAILED DESCRIPTION

Figure 3:
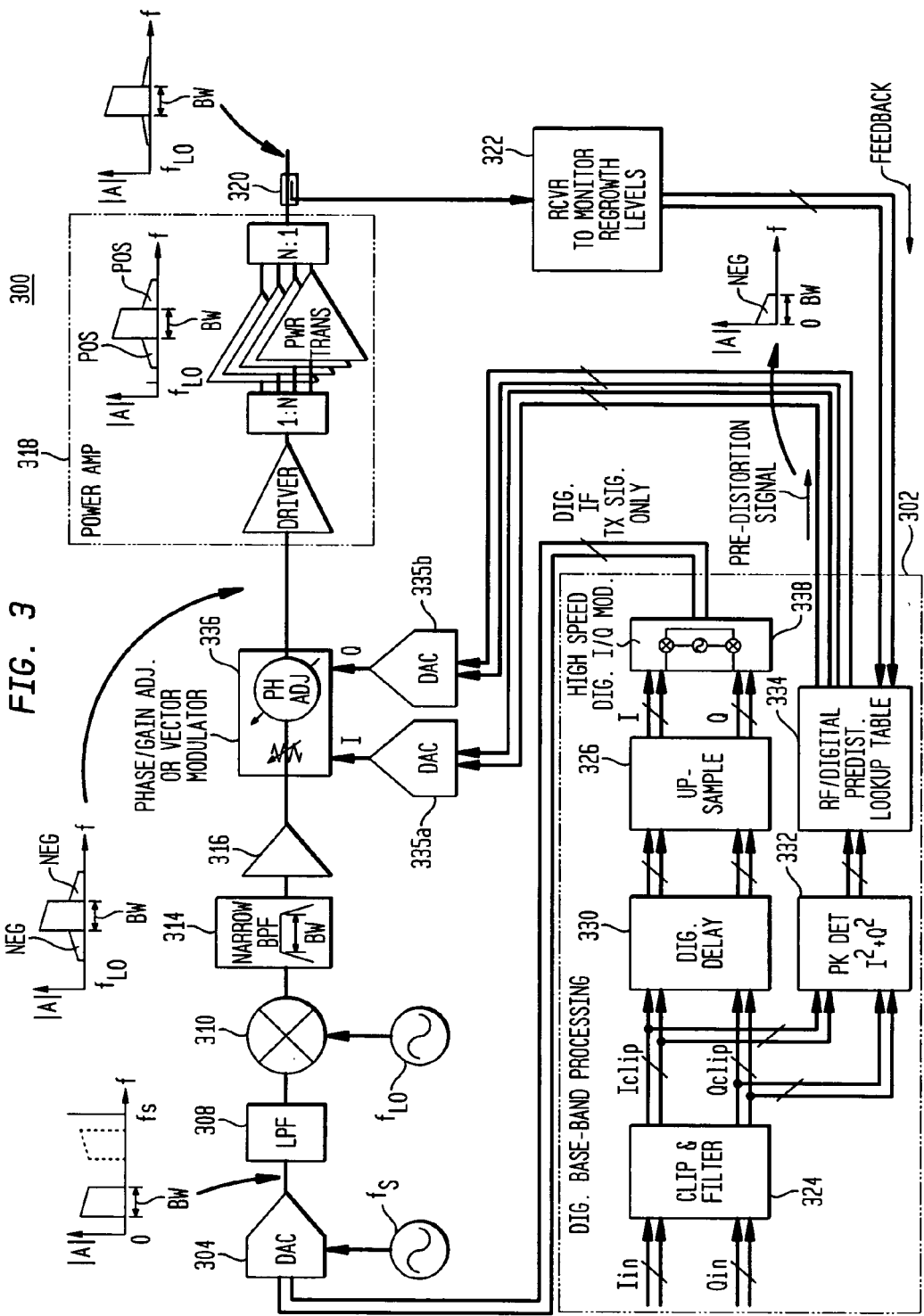
FIG. 3 shows a block diagram of a linearized amplifier system according to one embodiment of the present invention.

FIG. 3 shows a block diagram of a linearized amplifier system 300 according to one embodiment of the present invention. Unlike prior-art amplifier system 100, which performs its pre-distortion processing at baseband in the digital domain, and prior-art amplifier system 200, which performs its pre-distortion processing at RF, amplifier system 300 performs some of its pre-distortion processing at baseband in the digital domain and some of its pre-distortion processing at RF. In particular, digital baseband processor 302 functions as a digital baseband pre-distortion detector, which detects the signal envelope and retrieves the digital pre-distortion parameters A and B from a LUT at baseband, while the actual signal pre-distortion is performed by pre-distorter 336 (e.g., a phase/gain adjuster or a vector modulator) at RF in the analog domain.

Figure 2:
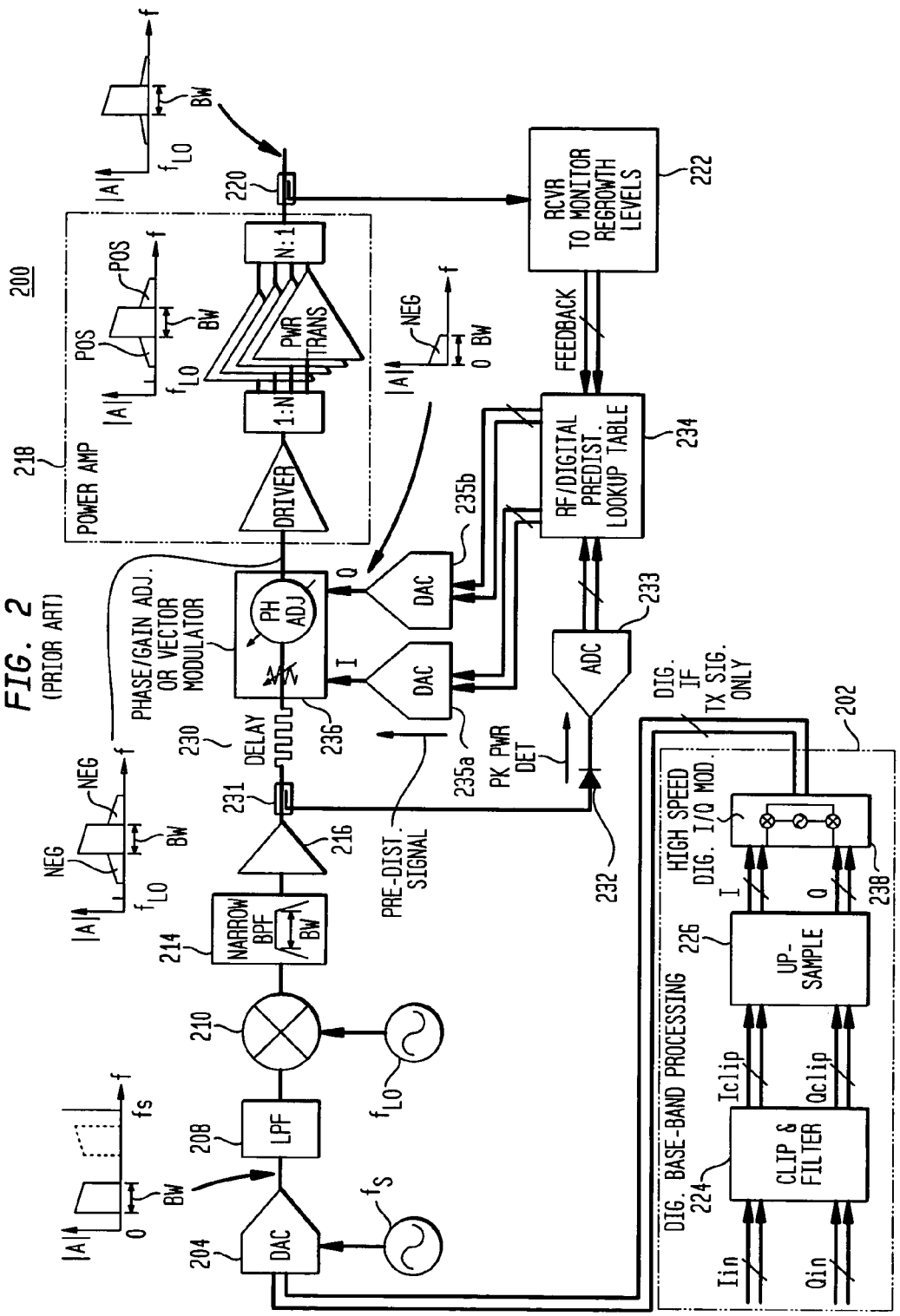
FIG. 2 shows a block diagram of another linearized amplifier system according to the prior art, in which input signal pre-distortion processing is implemented at RF.

In particular, processor 302 comprises clip & filter block 324, upsampler 326, and high-speed digital I/Q modulator 338, which are analogous to corresponding blocks 224, 226, and 238 of FIG. 2, to convert the digital baseband in-phase and quadrature input signals $I_{in}$ and $Q_{in}$ into an (undistorted) digital IF signal. In addition, for signal synchronization, processor 302 includes digital delay 330 between blocks 324 and 326.

Figure 1:
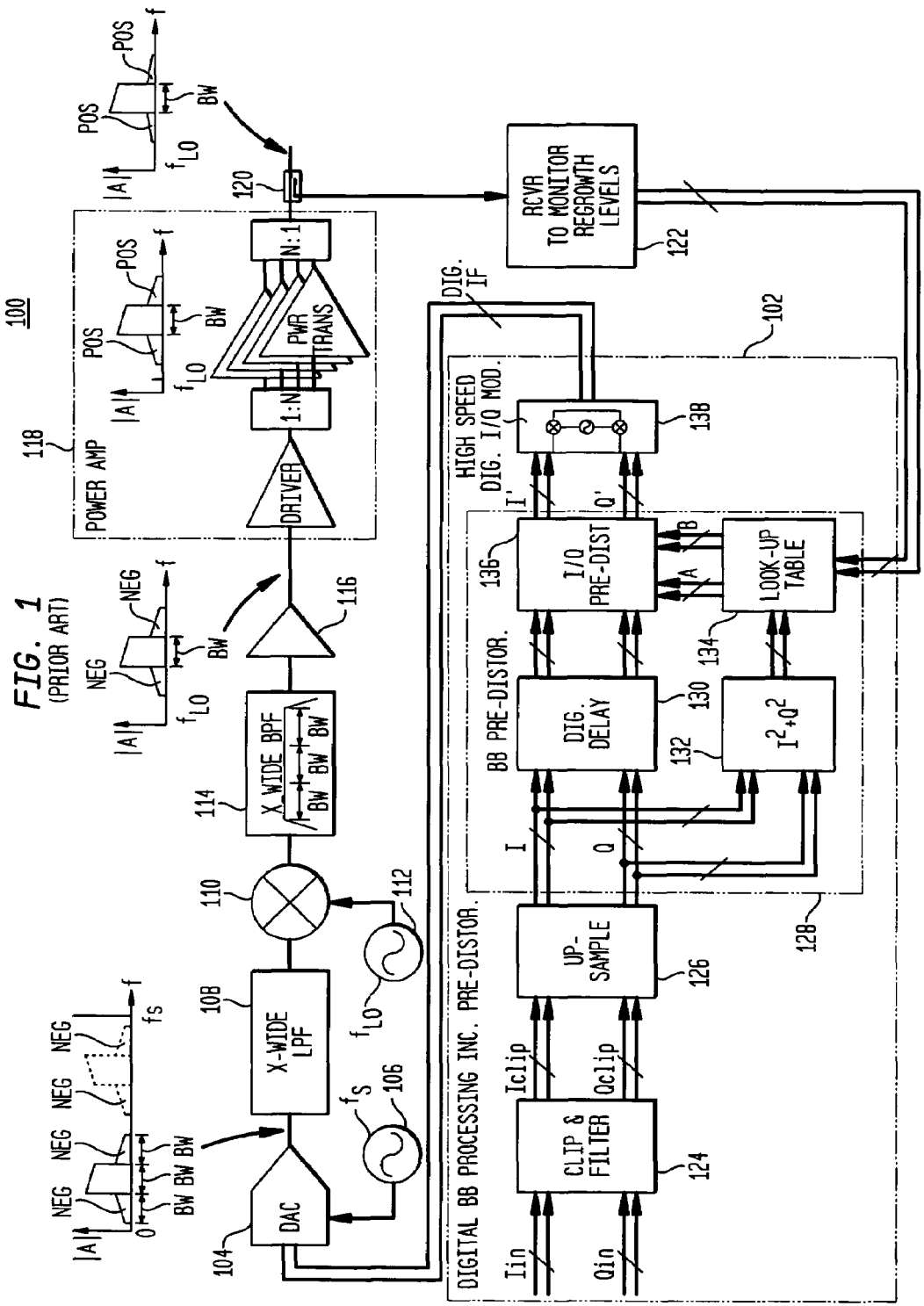
FIG. 1 shows a block diagram of a linearized amplifier system according to the prior art, in which input signal pre-distortion processing is implemented at baseband in the digital domain.

Processor 302 also includes peak detector 332 and LUT 334, which are analogous to corresponding blocks 132 and 134 of FIG. 1, to retrieve the digital pre-distortion parameters A and B, which are converted to the analog domain by DACs 335a-b. LUT 334 differs from LUT 134 of FIG. 1, because LUT 334 takes into account the non-linearity of the vector modulator.

System 300 also includes DAC 304, LPF 308, multiplier 310, narrow BPF 314, and low-power amplifier 316, which are analogous to corresponding blocks 204, 208, 210, and 214 of FIG. 2, to convert the digital IF signal from processor 302 into an (undistorted) analog RF signal.

This analog RF signal is then pre-distorted at analog pre-distorter 336 based on analog pre-distortion signals A and B from DACs 335a-b. The resulting pre-distorted RF signal is then applied to high-power amplifier 318 to generate the amplified output signal from linearized amplifier system 300.

As in amplifier systems 100 and 200, a portion of the amplified output signal can (optionally) be tapped by tap 320 and fed back to receiver 322, which monitors the amplified output signals for regrowth levels in order to dynamically update the values stored in LUT 334 for parameters A and B.

In FIG. 3, blocks 302-316, 320, 322, and 336 may be said to be part of a pre-distortion sub-system of amplifier system 300, which further comprises high-power amplifier 318

As with amplifier systems 100 and 200, amplifier system 300 can compensate not only for non-linearities in the high-power amplifier, but also for any distortion along the entire transmit path. Unlike amplifier systems 100 and 200, however, part of the pre-distortion processing of linearized amplifier system 300 is implemented in the digital domain at baseband and part in the analog domain at RF.

One advantage of this embodiment of the present invention over the "all-baseband" implementation of FIG. 1 is that the whole up-conversion section of the system (e.g., from DAC 304 through low-power amplifier 316) requires only the bandwidth of the signal and not the three or more times the signal bandwidth as required in the all-baseband implementation. Furthermore, one advantage of this embodiment over the "all-RF" implementation of FIG. 2 is that the detection and delay functions are performed at baseband in the digital domain rather than at RF in the analog domain, which is typically more costly and potentially less accurate. Thus, this embodiment of the present invention combines narrow-bandwidth advantages similar to those of the all-RF implementation of FIG. 2 with cost and accuracy advantages similar to those of the all-baseband implementation of FIG. 1.

Figure 4:
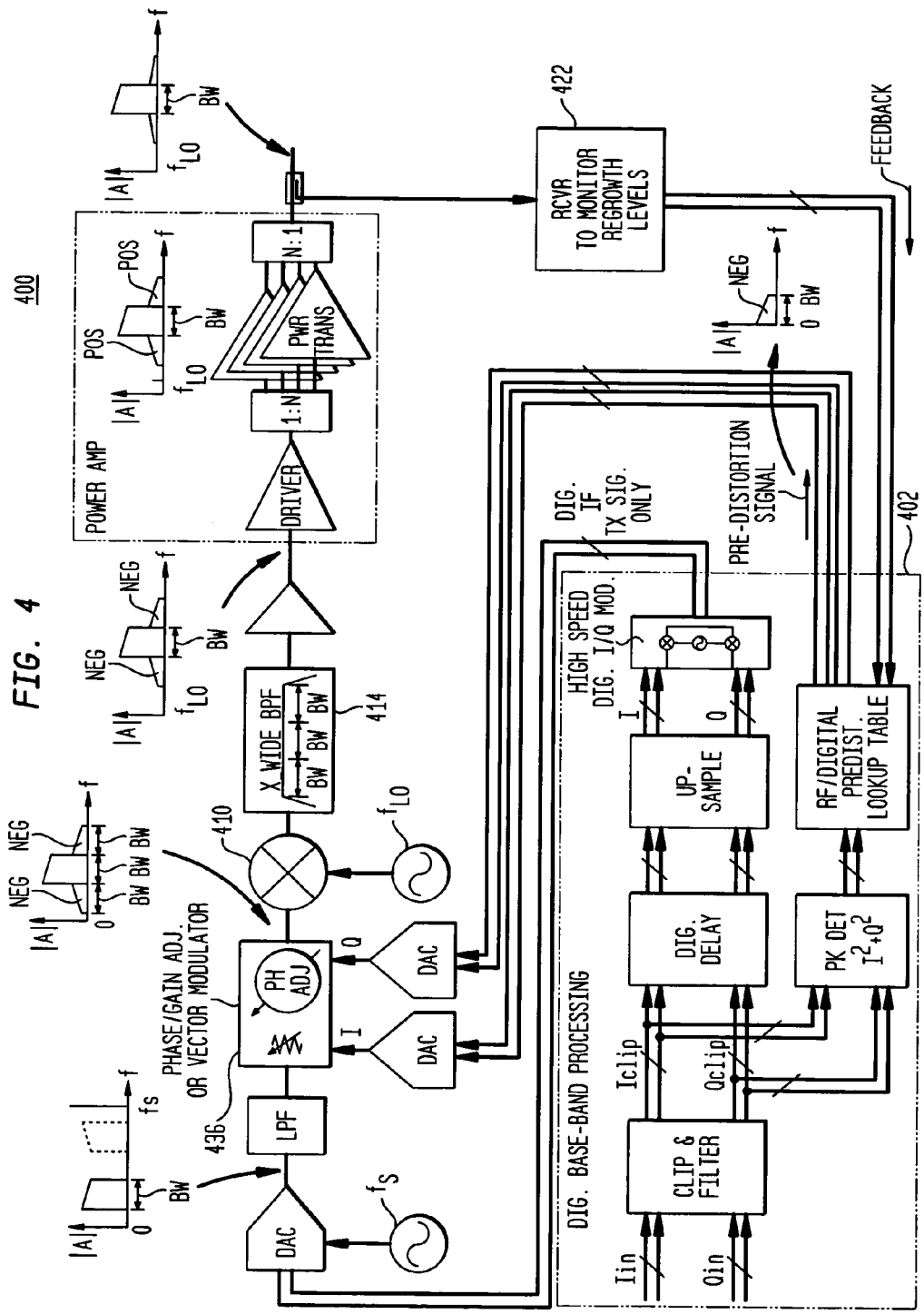
FIG. 4 shows a block diagram of a linearized amplifier system according to another embodiment of the present invention.

FIG. 4 shows a block diagram of a linearized amplifier system 400 according to another embodiment of the present invention. Like amplifier system 300, amplifier system 400 performs some of its pre-distortion processing at baseband in the digital domain and some of its pre-distortion processing at "non-baseband" in the analog domain. In this case, however, the non-baseband domain is the IF domain as opposed to the RF domain of system 300. In particular, digital baseband processor 402 functions as a baseband pre-distortion detector analogous to processor 302 of FIG. 3, which detects the signal envelope and retrieves the digital pre-distortion parameters A and B from a LUT at baseband, while the actual signal pre-distortion is performed by analog pre-distorter 436 (e.g., a phase/gain adjuster or a vector modulator) at IF in the analog domain.

Since, in amplifier system 400, pre-distorter 436 appears before multiplier 410, the band-pass filtering operation is performed using extra-wide BPF 414. As such, a larger proportion of the transmit path of amplifier system 400 is designed to pass wider bandwidths than that of amplifier system 300, but still a smaller proportion than in the prior-art all-baseband implementation of FIG. 1. Otherwise, amplifier system 400 is analogous to amplifier system 300, with similar advantages over prior-art systems 100 and 200.

ALTERNATIVE EMBODIMENTS

The present invention has been described in the context of particular implementations of linearized amplifier systems. Other embodiments of the present invention are also possible where a non-baseband (e.g., RF or IF) signal is pre-distorted based on data derived (e.g., retrieved from a LUT) as a function of the power (or, alternatively, the amplitude) of a corresponding digital baseband signal.

For example, the sequence of processing shown in FIGS. 3 and 4 may be different in alternative embodiments. One such example is that low-power amplifier 316 could appear after pre-distorter 336 in FIG. 3. Moreover, in other embodiments, certain (e.g., signal conditioning) functions might be eliminated and/or other (e.g., signal conditioning) functions added. Examples include the elimination of one or more of clipping & filtering, upsampling, low-pass filtering, band-pass filtering, and/or low-power amplification, depending on the requirements of the particular application.

Although the present invention has been described in the context of embodiments in which the pre-distortion parameters A and B are retrieved from LUTs, the invention is not so limited. In other embodiments, the pre-distortion parameters could be provided by alternative means, including by real-time computation for applications where the available computational speed is sufficiently fast. Moreover, the present invention can be implemented in the context of other pre-distortion algorithms based on other or additional parameters besides the standard pre-distortion parameters A and B.

The present invention may be implemented in the context of wireless signals transmitted from a base station to one or more mobile units of a wireless communication network. In theory, embodiments of the present invention could be implemented for wireless signals transmitted from a mobile unit to one or more base stations. The present invention can also be implemented in the context of other wireless and even wired communication networks to reduce spurious emissions.

Embodiments of the present invention may be implemented as circuit-based processes, including possible implementation on a single integrated circuit (such as an ASIC or an FPGA), a multi-chip module, a single card, or a multi-card circuit pack. As would be apparent to one skilled in the art, various functions of circuit elements, such as those associated with processors 302 and 402 and receivers 322 and 422, may also be implemented as processing steps in a software program. Such software may be employed in, for example, a digital signal processor, micro-controller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. An apparatus adapted to pre-distort an input signal prior to application to an amplifier such that the amplifier will generate a linearized amplified output signal, the apparatus comprising:
    a processor adapted to operate in a digital baseband domain to generate one or more pre-distortion parameters for the input signal, wherein the processor is adapted to detect power in a digital baseband signal corresponding to the input signal and generate the one or more pre-distortion parameters based on the detected power; and
    a pre-distorter adapted to pre-distort the input signal in a non-baseband domain based on the one or more pre-distortion parameters.

2. The apparatus of claim 1, wherein the pre-distorter is adapted to pre-distort the input signal in an analog non-baseband domain.

3. The apparatus of claim 2, wherein the pre-distorter comprises a phase/gain adjuster or a vector modulator.

4. The apparatus of claim 1, wherein the non-baseband domain is an RF domain.

5. The apparatus of claim 1, wherein the non-baseband domain is an IF domain.

6. The apparatus of claim 1, wherein the processor is adapted to retrieve the one or more pre-distortion parameters from a look-up table (LUT) based on the detected power.

7. The apparatus of claim 1, further comprising a low-pass filter (LPF) located between the processor and the pre-distorter, wherein the bandwidth of the LPF is comparable to the bandwidth of the input signal.

8. The apparatus of claim 7, further comprising an IF-to-RF up-converter located after the LPF and a band-pass filter (BPF) located after the up-converter and before the pre-distorter, wherein the bandwidth of the BPF is comparable to the bandwidth of the input signal.

9. The apparatus of claim 7, further comprising an IF-to-RF up-converter located after the pre-distorter and a BPF located after the up-converter.

10. The apparatus of claim 1, wherein the processor is adapted to digitally delay the input signal.

11. The apparatus of claim 1, wherein:
    the processor is adapted to:
        convert a digital baseband input signal into a digital intermediate frequency (IF) signal;
        detect power in the digital baseband input signal; and
        retrieve one or more digital pre-distortion parameters from a LUT based on the detected power;
    apparatus further comprises:
        a digital-to-analog converter (DAC), for each digital pre-distortion parameter, adapted to convert the corresponding digital pre-distortion parameter into an analog pre-distortion signal;
        another DAC adapted to convert the digital IF signal into an analog IF signal;
        an LPF adapted to low-pass filter the analog IF signal;
        an up-converter adapted to convert the filtered analog IF signal into an RF signal;
        a BPF adapted to band-pass filter the RF signal; and
        a low-power amplifier adapted to amplify the filtered RF signal, wherein:

the pre-distorter is adapted to pre-distort the amplified RF signal at RF based on the one or more analog pre-distortion signals to generate the pre-distorted input signal to be applied to the amplifier.

12. The apparatus of claim 11, wherein:
the processor is adapted to digitally delay the digital baseband input signal;
the bandwidth of the LPF is comparable to the bandwidth of the input signal; and
the bandwidth of the BPF is comparable to the bandwidth of the input signal.

13. The apparatus of claim 1, wherein:
the processor is adapted to:
 convert a digital baseband input signal into a digital IF signal;
 detect power in the digital baseband input signal; and
 retrieve one or more digital pre-distortion parameters from a LUT based on the detected power;
the apparatus further comprises:
 a DAC, for each digital pre-distortion parameter, adapted to convert the corresponding digital pre-distortion parameter into an analog pre-distortion signal;
 another DAC adapted to convert the digital IF signal into an analog IF signal; an LPF adapted to low-pass filter the analog IF signal, wherein:
  the pre-distorter is adapted to pre-distort the filtered IF signal at IF based on the one or more analog pre-distortion signals to generate a pre-distorted IF signal;
 an up-converter adapted to convert the pre-distorted IF signal into a pre-distorted RF signal;
 a BPF adapted to band-pass filter the pre-distorted RF signal; and
 a low-power amplifier adapted to amplify the filtered pre-distorted RF signal to generate the pre-distorted input signal to be applied to the amplifier.

14. The apparatus of claim 13, wherein:
the processor is adapted to digitally delay the digital baseband input signal; and
the bandwidth of the LPF is comparable to the bandwidth of the input signal.

15. A method for pre-distorting an input signal for application to an amplifier such that the amplifier will generate a linearized amplified output signal, the method comprising:
 operating in a digital baseband domain to generate one or more pre-distortion parameters for the input signal, wherein the operating comprises (i) detecting power in a digital baseband signal corresponding to the input signal and (ii) generating the one or more pre-distortion parameters based on the detected power; and
 pre-distorting the input signal in a non-baseband domain based on the one or more pre-distortion parameters.

16. The method of claim 15, further comprising amplifying the pre-distorted input signal to generate the linearized amplified output signal.

17. The apparatus of claim 1, further comprising the amplifier.

18. A pre-distortion sub-system adapted to pre-distort an input signal prior to application to an amplifier such that the amplifier will generate a linearized amplified output signal, the pre-distortion sub-system comprising:
 a processor adapted to operate in a digital baseband domain to generate one or more pre-distortion parameters for the input signal;
 a pre-distorter adapted to pre-distort the input signal in a non-baseband domain based on the one or more pre-distortion parameters; and
 a low-pass filter (LPF) located between the processor and the pre-distorter, wherein the bandwidth of the LPF is comparable to the bandwidth of the input signal.

19. The sub system of claim 18, further comprising an IF-to-RF up-converter located after the LPF and a band-pass filter (BPF) located after the up-converter and before the pre-distorter, wherein the bandwidth of the BPF is comparable to the bandwidth of the input signal.

20. The sub system of claim 18, further comprising an IF-to-RF up-converter located after the pre-distorter and a BPF located after the up-converter.

* * * * *